Patented Feb. 7, 1933

1,897,011

UNITED STATES PATENT OFFICE

JOSEPH F. PUTNAM, OF BERKELEY, CALIFORNIA, ASSIGNOR TO STANDARD OIL COMPANY OF CALIFORNIA, OF SAN FRANCISCO, CALIFORNIA, A CORPORATION OF DELAWARE

METHOD OF SEPARATING EMULSIONS

No Drawing.   Application filed June 11, 1929.   Serial No. 370,163.

This invention relates to the separation of the two phases of an emulsion, and particularly relates to the separation of materials emulsified in a continuous phase which is an electrolytic conductor. More particularly, the invention relates to a method of separating heavy hydrocarbons emulsified in a continuous phase which is an electrolytic conductor, in the form of coherent masses of hydrocarbon.

An object of this invention is to disclose and provide a method of treating emulsions so as to separate a liquid substance emulsified in an electrolytic conductor. Another object is to separate an emulsion consisting of a continuous electrolytic phase and liquid hydrocarbons in the dispersed phase, and to separate the liquid hydrocarbons from the emulsion in the form of a coherent mass or body.

A still further object is to disclose and provide a method of separating asphalt from emulsions thereof in a continuous phase which is an electrolytic conductor. Another object is to disclose and provide a method whereby asphaltic emulsions may be used in coating metallic objects with asphalt.

A still further object is to disclose and provide a method of forming asphaltic emulsions in a continuous phase which is an electrolytic conductor, and separating asphalt from such emulsions by plating the asphalt upon a metallic object.

Other objects, advantages, uses and adaptations of this invention will become apparent from the following discussion.

It has been discovered that emulsions wherein the external or continuous phase is an electrolytic conductor may be separated by passing a unidirectional electric current through the emulsion. It appears that in most cases an emulsion of the character described hereinabove consists of an internal phase which is a negatively charged body surrounded by an interfacial insulator composed of an emulsifying agent, through which the bound positive charge is held, these negatively charged bodies being finely dispersed throughout the external or continuous phase.

When a unidirectional electric current is passed through the emulsion, the material comprising the internal phase is carried to one of the electrodes, and if the internal phase is negatively charged, as is apparently the case in most instances, the flow will be toward the anode or positive electrode.

This invention is particularly directed to the treatment of emulsions containing materials or viscous liquids in the internal or dispersed phase. By viscous materials asphalt, tars, asphaltene, pyrobitumens, butter fat, creosols, paraffines and numerous other substances are included.

The invention is not to be confused with methods of breaking emulsions wherein the external phase is a non-conductor. Emulsions of substances in an external phase which is a non-conductor have been broken by creating an electrical field (without flow of current), to cause the dispersed particles to coalesce and settle out. The invention is also to be distinguished from electro-plating processes, wherein a metallic salt is dissolved in an electrolyte and a current passed through the solution to separate the positive metallic ions and negative ions, the metallic ions being the positive plated upon the negative electrode. In the method embraced by this invention, the flow of the dispersed particles of the emulsion toward the electrode appears to be due partly to the attraction between the electrode, and those bodies which bear an opposite electrical charge, and partly to the continuous flow of ions toward the electrodes.

Although various types of emulsions may be separated by the method embraced by this invention, particular reference will be made here, for purposes of illustration, to the separation of asphaltic emulsions. In preparing asphaltic emulsions for the purpose of separating asphalt therefrom, steam refined asphalt is to be preferred to air blown asphalt, as more desirable coatings can be obtained by the use of steam refined asphalt. The emulsion may be prepared in any desirable manner. For example, an emulsion of asphalt and water may be employed. While pure water is only slightly ionizable, water obtained from the usual natural sources contains sufficient salts in solution to provide a suitable electrolyte as the continuous phase.

In carrying out the invention, an anode and a cathode are placed in the emulsion and a direct current is passed between the electrodes, with the result that the asphalt is rapidly deposited upon the anode. With this type of emulsion there do not appear to be any rigid requirements as to shape, size or spacing of electrodes or current density or degree of dispersion.

There does not appear to be any critical relation between the quantity of the dispersed phase to the continuous phase. So long as the potential is sufficient to attract the charged particles of the dispersed phase, the two phases can be separated, and as long as the electrodes are immersed in the emulsion and the flow of current has not been stopped, the asphalt plated or coated upon the anode does not appear to insulate the anode.

Deposits of any desired thickness may be formed on the anode by using low potentials, for example, from 2 to 30 volts.

The characteristics of the deposit produced in accordance with the method described hereinabove may also be changed and/or controlled by the strength of the current used. For example, when asphalt is the substance dispersed in a continuous electrolytic phase, the penetration and ductility as well as the appearance of the final plating or coating on the anode may be regulated. For example, by increasing the voltage spongy coatings may be produced, whereas at lower voltages, for example at 12 volts and below, a dense coating results. By increasing the voltage a thicker coating is deposited in a given time.

The properties of the deposited coating are affected by the nature of the emulsifying agents used in the emulsion from which the dispersed phase is being separated. For example, when asphalt is the dispersed material numerous substances may be used as emulsifying agents in forming the emulsion. As is well known in the art soaps, asphaltenes, finely divided colloidal materials and gums may be used as emulsifying agents.

Soaps, as a rule, give the deposit formed during the separation in accordance with this invention, a velvety character, colloidal materials give the coating a granular character, finely divided material such as colloidal sulphur decreases the electrical conductivity and the porosity of the product, and finely divided material such as clay increases the ductility of asphaltic deposits.

One of the industrial uses of this invention is the application of asphaltic, tarry or other coatings of a viscous material to metallic bodies. For example, it is desirable to coat pipes with an asphaltic composition so as to prevent corrosion thereof when the pipes are laid in the ground for use. It has been the practice to apply the asphalt in heated condition, or to apply an emulsion of asphalt and water. When an emulsion of asphalt and water has been applied heretofore, it is difficult to get a smooth and even layer with good adhesive properties. By forming a suitable asphaltic emulsion, then placing the pipe to be coated in said emulsion, forming an anode of said pipe, placing a cathode in said emulsion, and then passing a unidirectional current through the emulsion, it will be found that a hard, smooth, dense and even coating of any desired thickness may be formed on the pipe.

In forming said coatings, any desired asphaltic emulsion may be used, but for purposes of illustration one particular asphaltic emulsion which has been found to be very effective is here given. An emulsion has been used containing about 54 percent steam refined asphalt, 40 percent of water, 5.5 percent of a suitable soap base and 0.5 percent finely powdered sulphur. An emulsion made of the above general description is preferably diluted with about twice its volume of water just before using, so that the final emulsion contains about 15 to 25 percent of asphalt. The pipe to be coated with asphalt may then be placed in said emulsion and connected with the positive terminal of a source of unidirectional electric current. A cathode is also placed in the emulsion and a current at a suitable potential then passed through the emulsion.

Although voltages between 2 and 75 volts have been employed, it has been determined that smooth and dense coatings are obtained at the lower voltages, namely, at voltages of about 12 volts and under. When higher voltages are used the deposit is of spongy character. The initial current density with 12 volts (using an emulsion of the hereinabove described composition) was about 0.5 amperes per square inch, which dropped off to a negligible quantity in from 10 to 30 minutes. It has been discovered that the plating solution or emulsion should not be depleted below about 50 percent of its original asphalt content.

The reason for maintaining the concentration of asphalt fairly high in the plating solution or emulsion is that the method may be operated at much greater efficiency if the emulsion is not depleted. A much greater quantity of substance can be plated out per ampere hour when the concentration of the substance in the emulsion is fairly high. In using asphaltic emulsions, therefore, the plating emulsion should contain not less than about 8 per cent of asphalt and preferably between 8 and 25 percent. As an emulsion is depleted by carrying out the method, the concentration of the asphalt in the emulsion may be increased by adding to the plating emulsion a similar emulsion of higher asphalt content.

When it is desired to plate a metallic surface such as, for example, a pipe, a voltage or potential may be employed which produces a slightly porous or spongy coating, but before the plating operation is completed or when the deposit has reached the desired thickness, the flow of current through the emulsion may be suddenly boosted. This step increases the density of the coating and stops the flow of current. Apparently the sudden increase in current causes the particles of asphalt or other viscous substance being plated, to coalesce thus expelling the water or other electrolytic continuous phase which may be occluded in the coating, giving the viscous substance a better bond to the anode and forming an insulating coating.

As has been stated heretofore, the method of this invention is not only applicable to the treatment of asphaltic emulsions, but is applicable to the separation of any material dispersed in a continuous electrolytic phase. Numerous changes and modifications may be made in the method without departing from the spirit of this invention, and all such changes and modifications as come within the scope of the appended claims are embraced thereby.

I claim:

1. A method of separating emulsions containing a material dispersed in a continuous electrolytic phase, comprising placing an anode and a cathode in said emulsion, passing a unidirectional current through said emulsion to deposit said viscous material from said emulsion upon said anode, and then increasing the flow of current to express the liquid constituting the continuous phase from the deposit of material formed upon said anode.

2. A method of separating emulsions containing hydrocarbon material dispersed in a continuous electrolytic phase, comprising placing an anode and a cathode in said emulsion, passing a unidirectional electric current through said emulsion to deposit said hydrocarbon material from said emulsion upon said anode, and then increasing the flow of current to express the liquid constituting the continuous phase from the deposit of material upon said anode.

3. A method of forming asphaltic coatings on metallic pipe which comprises, immersing a metallic pipe as an anode in an emulsion of asphaltic material dispersed in a continuous phase which is an electrolytic conductor, placing a cathode in said emulsion, passing a unidirectional current through said emulsion to deposit said asphaltic material from said emulsion upon said pipe, and then increasing the flow of current to express the liquid constituting the continuous phase from the asphaltic deposit formed upon said pipe.

4. A method of forming asphaltic coatings on metallic pipe which comprises forming an emulsion of asphaltic material dispersed in a continuous electrolytic phase, said emulsion containing between 8 and 30% of asphalt, placing a metallic pipe to be coated as an anode on a separate cathode in said emulsion, passing a unidirectional current through said emulsion to deposit asphalt upon said pipe anode, maintaining the asphalt contained in said emulsion at between 8 and 30% asphaltic material during the deposition of said asphaltic material upon the pipe anode, and then increasing the flow of current to express the continuous electrolytic phase from the deposit of asphalt formed upon said pipe anode.

5. In a method of forming asphaltic coatings on metallic pipe, the steps of forming an emulsion of asphalt in a continuous electrolytic phase, said emulsion containing between 15 and 25% of asphalt, placing a metallic pipe as an anode and a separate cathode in said emulsion, passing a unidirectional electric current through said emulsion to deposit asphalt upon said pipe anode, maintaining the asphalt content of said emulsion at between about 15 and 25% during said deposition, and then increasing the flow of current to express the liquid constituting the continuous phase from the asphaltic deposit formed upon said pipe anode.

Signed at Richmond, Calif., this 3rd day of June, 1929.

JOSEPH F. PUTNAM.